United States Patent

Loffbourrow

[15] 3,673,398
[45] June 27, 1972

[54] SEISMIC PLAYBACK SYSTEM

[72] Inventor: Robert J. Loffbourrow, Houston, Tex.
[73] Assignee: Texaco Inc., New York, N.Y.
[22] Filed: June 30, 1971
[21] Appl. No.: 158,582

Related U.S. Application Data

[63] Continuation of Ser. No. 842,477, July 17, 1969, abandoned.

[52] U.S. Cl. .................... 235/154, 340/347 DA, 340/15.5 R, 235/150.53
[51] Int. Cl. ....................................................... H03k 13/00
[58] Field of Search .................. 340/347 DA, 15.5, 347 AD; 235/154, 197, 198, 150.53; 328/142; 179/15 AV

[56] References Cited

UNITED STATES PATENTS 3,239,833  3/1966  Gray ...................................... 340/347

Primary Examiner—Maynard R. Wilbur
Assistant Examiner—Charles D. Miller
Attorney—K. E. Kavanagh, Thomas H. Whaley and Robert J. Sanders, Jr.

[57] ABSTRACT

Hereinafter disclosed is methodology and apparatus for converting wide dynamic amplitude range digital data recorded in floating point digital word form, comprising a binary coded mantissa and a binary coded exponent, to an analog signal or visible display, such as an oscillogram of selectively compressed dynamic amplitude range. The digital word occupying a number of binary bit positions is, in algebraic form, $\pm AG^{-E}$; wherein A represents the mantissa or argument, G represents the base or radix of the number system used and E represents the exponent. Since the base G is constant (at for example 8) the only binary bits that need to be recorded are those representing the mantissa A and the exponent E. In reconverting the digital data to analog form for making an oscillogram, wiggle trace or other visible display, the invention contemplates selectively compressing the dynamic amplitude range of the analog signals and at the same time avoiding the introduction of serious distortions.

8 Claims, 2 Drawing Figures

SEISMIC PLAYBACK SYSTEM

This application is a continuation of application Ser. No. 842,477 filed July 17, 1969 now abandoned.

BACKGROUND OF THE INVENTION

This invention pertains, in general, to making analog form playbacks from digitally recorded data (e.g., seismic data) which has been digitized from wide dynamic amplitude range analog form data signals initially generated by transducers, such as geophones in response to acoustically induced seismic disturbances and, in particular, to the making of analog form playbacks such as oscillograms (or wiggle traces as they are often called by those engaged in seismic work) or other visible displays, which are approximate, but very useful, reproductions in compressed range of the wide dynamic range amplitude-versus-time characteristic curves of the analog signal initially generated by the aforesaid transducers or geophones.

Although the invention is hereinafter described as being employed in conjunction with digital seismic recording systems such as those disclosed in the patents and patent applications hereinafter identified it is, nevertheless, to be understood that the invention's field of use is not limited to seismic data processing.

In seismic exploration work each acoustically driven geophone generates wide dynamic amplitude range signals in analog form. When such signals are processed through a digital seismic recording system of the type disclosed in the patents and patent applications hereinafter identified there is produced a high fidelity record in digital form covering the wide dynamic range of amplitudes of the analog signals. The reason that the digital form record is referred to, hereinafter, as a high fidelity record is because the signal amplitudes are recorded accurately throughout their wide dynamic range; e.g., many binary bit positions or locations are used to accurately record the highest signal amplitudes as well as the lowest signal amplitudes where the range (i.e., the ratio of the highest amplitudes to the lowest) may be of the order of $10^6$.

The invention hereinafter disclosed provides methodology and apparatus for making analog form visible displays such as oscillograms or wiggle traces from the recorded digital data. The oscillograms or wiggle traces are of relatively lower fidelity than the aforementioned digitally recorded data. Although the oscillograms are of relatively lower fidelity, serious distortions are, nevertheless, not introduced in reconverting the digital data to compressed amplitude analog form data.

The recordation in digital form of wide dynamic amplitude range analog form signal initially generated by a geophone is disclosed, in, among others, the following: U. S. Pat. No. 3,241,100 granted Mar. 15, 1966 in behalf of R. J. Loofbourrow and entitled "Digital Seismic Recording System"; U. S. Pat. No. 3,264,574 granted Aug. 2, 1966 in behalf of R. J. Loofbourrow and entitled "Amplifier System"; U. S. Pat. application Ser. No. 786,706 now U.S. Pat. No. 3,603,972, filed Dec. 24, 1968 in behalf of James R. Vanderford and entitled "Amplifier System," and U. S. patent application Ser. No. 786,369 now U.S. Pat. No. 3,562,744 filed Dec. 24, 1968 in behalf of Donald L. Howlett and entitled "Amplifier System."

As is disclosed in the patents and patent applications hereinbefore identified, the problem solved is the problem of accurately recording seismic data, which in analog form has a dynamic range of amplitudes which is extremely wide. For example, a typical analog signal level for a reflection seismic record runs from several volts of amplitude at its maximum, at the early shock portion of the record, to less than a microvolt at the end of the seismic record when very low amplitude seismic disturbances are detected.

Put very generally, the patents and patent applications hereinbefore identified solve the problem by converting the wide dynamic amplitude range analog signals to digital form. When converted to digital form, occupying a relatively large number of binary bit positions, the full dynamic amplitude range of the analog signal initially generated by a geophone is preserved in recorded form on magnetic tape. Advantageously, the magnetically recorded digital data may, subsequently, be delivered to an electronic computer for further processing. Some ways and some purposes for which such digital data is subsequently processed in an electronic computer is disclosed in an article "Tools for Tomorrow's Geophysics" by Milton B. Dobrin and Stanley H. Ward published in the journal "Geophysical Prospecting" volume X at pages 433–452 (1962).

In the aforementioned patent applications of Vanderford and Howlett there is described a system wherein portions of an analog signal are converted to digital words wherein each digital word occupies a number of binary bit positions. Moreover, each such digital word is recorded in a floating point form. Advantageously, the floating point form or notation allows greater flexibility of operation and easier handling of numbers differing greatly from each other in magnitude. See for example the textbook "Digital Computer Primer" by E. M. McCormick, 1959, published by McGraw-Hill Book Co., Inc., beginning at page 152. In the systems disclosed in the Vanderford and Howlett patent applications, hereinbefore identified, a floating point digital number, or word, in the form of a mantissa, or argument, and an exponent is recorded on magnetic tape. The floating point digital number, or word, represents the instantaneous absolute seismic voltage amplitude as it enters the floating point amplifier system. The dynamic range of the floating point number, or word, may be in excess of 200 db, if necessary, to cover the dynamic amplitude range of input signals (equivalent to a 36 binary bit digital number or word). As a specific example the floating point word as set forth in conventional algebraic form is as follows:

$$Q = \pm AG^{-E} \quad \text{(Equation 1)}$$

Wherein $Q$ represents the absolute magnitude or amplitude of the floating point word; $A$ represents the mantissa or argument portion of the word; $G$ represents the base of the number system used ($G = 10$ in the decimal, or base 10, system or $G = 8$ in the octal system) AND $E$ represents the exponent.

As is suggested in the Vanderford patent application the floating point digital word is in the form:

$$Q = \pm A 8^{-E} \quad \text{(Equation 2)}$$

Wherein $Q$ represents the absolute magnitude of the amplitude of the input signal to an arrangement of amplifiers, each of which has a gain of eight (8), and, hence, the base $G$ in equation 1 becomes 8 in equation 2; the mantissa $A$ represents the output amplitude of a particular amplifier in the aforesaid arrangement; and, $E$, the exponent, represents the number of amplifier stages of gain of eight (8) through which the input signal has been processed.

In order to record the floating point digital word of Equation 2 in a binary register with, for example, 144 db. of dynamic range and 14 binary bit accuracy, 18 bit positions would be required: where the mantissa $A$ is represented in binary form (i.e., where the base or radix of such a number system is 2) and where the exponent $E$ is also represented in binary form. Of the 18 bits required: one bit represents the sign allowing for bipolar output-input capabilities; 14 bits represent the mantissa; and, three bits represent the exponent.

Although there are many advantages (some of which are set forth in the aforementioned article by Dobrin and Ward) to recording seismic signals in digital form there still remains the need to make available to a seismic prospector a visible display or recording of the seismic data or portions of it. Conventionally, the visible record is an oscillogram (or wiggle trace as it is often called by seismic prospectors). Often it is desirable for a seismic prospector in a seismic field crew in a remote location from a main data processing center to take a quick look at a portion of the seismic data from time-to-time, i.e., look at wiggle traces. For example, a seismic prospector may wish to make some interpretations with respect to the wiggle trace data in order to coordinate such data with geological data.

The invention hereinafter disclosed and illustrated in the accompanying drawings is particularly concerned with converting the recorded digital data to the familiar wiggle trace form on recorded paper. The recording paper allows for about 40 db. dynamic amplitude range while the digital floating point word may have a dynamic range of 156 db., or more. Hence, in converting from digital form to a practical analog form selective compression of the various amplitudes must occur. In such a conversion, distortion is necessarily introduced. However, in accordance with the methodology and apparatus of the present invention such distortion is minimized and as a result there is provided analog form data in the form of oscillograms, or wiggle traces, which provide useful information to seismic prospectors, among others.

SUMMARY OF THE INVENTION

One object of the present invention is to convert data from a digital form to an analog form.

Another object of the present invention is to provide new and useful methodology for converting data from digital form to analog form.

Another object of the invention is to provide new and useful apparatus for converting data from digital form to analog form.

Another object of the present invention is to convert wide dynamic amplitude range digital data (e.g., seismic data) to analog form visible displays such as oscillograms, or wiggle traces.

Another object of the present invention is to convert wide dynamic amplitude range digital data to analog form data such as oscillograms, which oscillograms are selectively compressed reproductions of wide dynamic amplitude range analog signals which existed prior to their conversion to said digital data.

Another object of the present invention is to convert wide dynamic amplitude range digital form data to analog form data having selectively compressed amplitudes, without introducing serious distortion.

Briefly, in accordance with an illustrative embodiment of the invention digitally recorded signals representative of a mantissa $A$ and an exponent $E$ are processed for the purpose of obtaining a desired analog signal which is ultimately used to drive a galvanometer to make an oscillogram of the analog signal. In order to achieve the desired result (i.e., to obtain a suitably compressed amplitude range analog signal for making the oscillograms) the binary bits representing the mantissa $A$ and the exponent $E$ are separately processed. The binary bits representing the mantissa $A$ are delivered to a digital-to-analog converter. At the same time the binary bits representing the exponent $E$ are delivered to a decoder unit and an amplifier arrangement. The binary bits representing the exponent $E$ data are converted to unique output voltage levels corresponding to the gain information contained in the exponent $(E)$ data. From the exponent data there is developed a reference voltage identified as $V_{ref}$, which reference voltage is delivered to the aforesaid digital-to-analog converter where the mantissa data is being processed. The reference voltages developed from the exponent $(E)$ data is combined with the mantissa $(A)$ data in the digital-to-analog converter. Suffice it to say: that the analog voltages developed by the digital-to-analog converter represents a compressed amplitude range analog signal corresponding to the mantissa data and the gain data (represented by the exponent $E$). More particularly, the gain data contained in the exponent $E$ is processed to account for the natural energy decay of the seismic processes. Ultimately, this data contained in the exponent is developed into a reference voltage which modifies the amplitude data contained in the mantissa.

DRAWINGS

In FIG. 1 there is depicted a block diagram of a generalized form of the invention illustrating apparatus for converting wide dynamic amplitude range digital $A$ and $E$ data to compressed amplitude range analog signals for the purpose of making visible displays therefrom, such as oscillograms or wiggle traces.

In FIG. 2 there is shown a graph of the absolute value of $V_{ref}$ as a function of time.

DESCRIPTION OF THE PREFERRED EMBODIMENT

Figure 1:
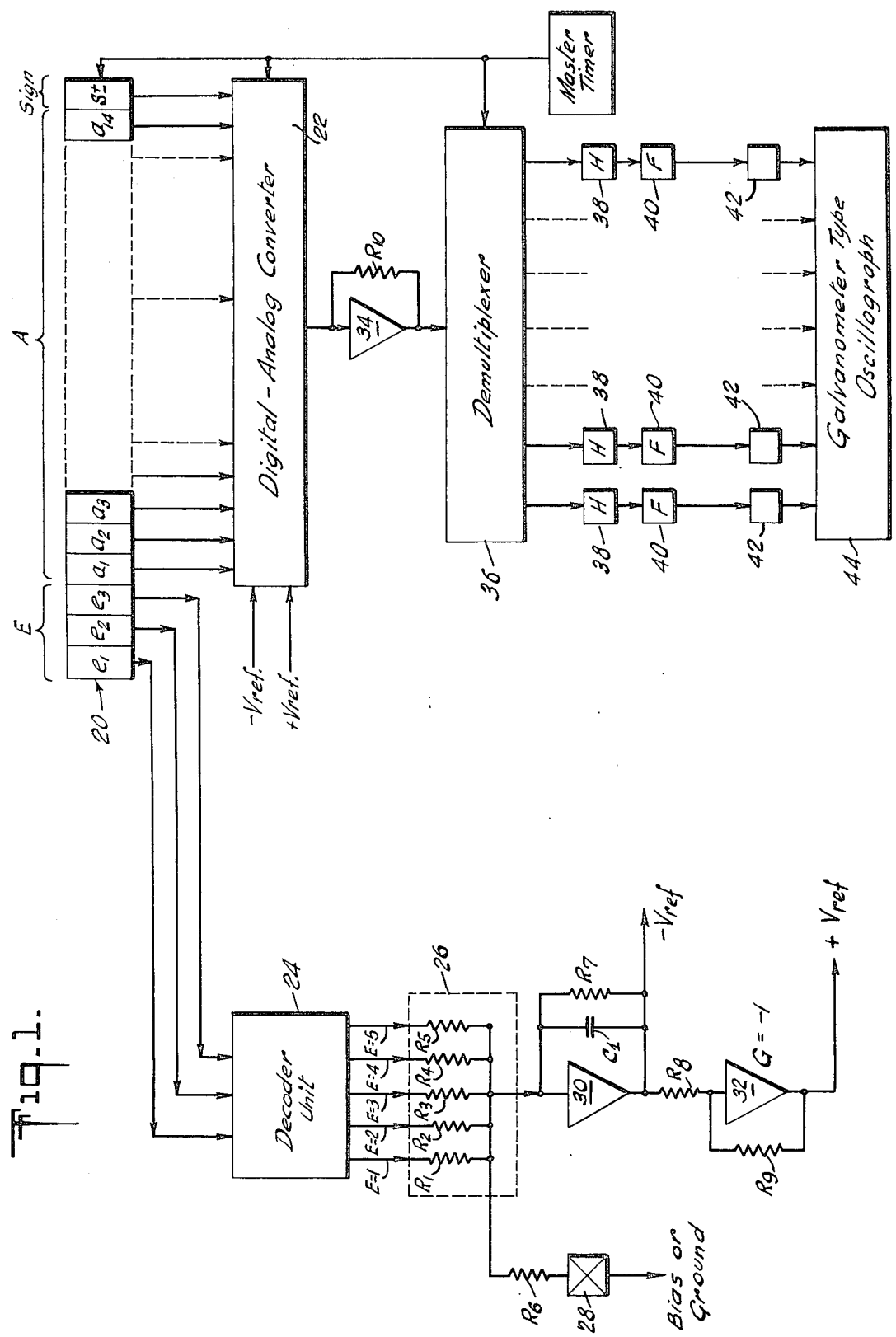

As shown in the drawing there is provided a register 20 which stores eighteen binary digits, or bits, which represent, in digital form, the amplitude of a seismic signal generated by a geophone. Of these eighteen bits three bits identified at bit locations $e_1$, $e_2$, and $e_3$ in register 20 represent the exponent $E$ of a floating point digital number, or word. In register 20 the fourteen bits identified at bit locations $a_1$ through $a_{14}$ represent a mantissa $A$ and the one bit identified at bit location $S\pm$ represents the sign, or polarity, of the seismic signal.

The aforementioned eighteen bits may be assumed to have been initially recorded in a suitable storage means, such as on magnetic tape, in the amplifier system disclosed in the U.S. Pat. application of James R. Vanderford, Ser. No. 786,706, filed Dec. 24, 1968. For purposes of the present disclosure it may be assumed that the bits recorded in the Vanderford system are subsequently transferred to the storage register 20. Moreover, the register 20 may be included in the amplifier system of Vanderford or, for present playback purposes, may be considered to be an auxilliary register. Also, as indicated hereinbefore, since each amplifier stage in Vanderford's amplifier system has a constant gain of eight, then only the bits representing the exponent $E$ and the mantissa $A$ need to be recorded and, ultimately, transferred to register 20.

The one bit representing the sign ($S\pm$) and the 14 bits representing the mantissa $A$ are, as indicated in the drawing, subsequently transferred to a digital-to-analog (D–A) converter 22.

As shown in the drawing two additional inputs to the (D–A) converter 22 are provided. One input is a positive reference voltage identified as $+V_{ref}$. Another input to the (D–A) converter 22 is a negative reference voltage $-V_{ref}$. The source and character of $+V_{ref}$ and $-V_{ref}$ is discussed hereinafter in more detail.

The three bits ($e_1$, $e_2$, and $e_3$) representative of the exponent $E$ are transferred from the register 20 to a decoder unit 24. The decoder unit 24 converts the digital signals representative of the binary digits $e_1$, $e_2$, and $e_3$ to an analog voltage output. In other words, the decoder unit 24 is, in effect, a digital-to-analog converter for the exponent $E$. Inasmuch as there is a unique exponent $E$ for each digital word, or number, contained in register 20 the decoder unit 24 delivers at the output thereof one, and only one, analog voltage signal corresponding to each digital word in register 20. As shown, the output from decoder unit 24 is delivered to a weighting network 26 which is comprised of the five resistance elements identified as $R_1$, $R_2$, $R_3$, $R_4$, and $R_5$. Note that only five resistance elements $R_1$ through $R_5$ are shown because it is assumed for present purposes that the exponent $E$ may have any one of eight decimal values although only five are used in this description, i.e., $E$ may equal either 1, 2, 3, 4, or 5. However, it is to be understood that should the exponent $E$ embrace more than eight unique values then, accordingly, additional bits or bit locations may be provided in register 20 and, correspondingly, more than five resistance elements may be provided in the network 26. The operation of the weighting network 26 is discussed hereinafter in more detail.

As shown in the drawing the ends of the summing resistance elements $R_1$ through $R_5$ are commonly connected together with the summing resistance element $R_6$. Connected between the resistance element $R_6$ and a source of bias voltage or ground is a clamp switch 28 for setting an initial output amplitude for the playback signals.

As shown the analog output voltage from the network 26 is delivered to the input of an operational amplifier 30. Connected in parallel with the amplifier 30 between the input and output terminals thereof is the capacitor $C_1$. Connected in parallel with the capacitor $C_1$ as shown is the feedback resistance element $R_7$. From the output of the operational amplifier 30 there is extracted a negative reference voltage identified as $-V_{ref}$. This negative voltage source $-V_{ref}$ is, as indicated, delivered to the digital-to-analog converter 22.

The operational amplifier 30, together with its capacitor $C_1$ and the resistance element $R_7$ form an integrator configuration. As shown, the output signal from operational amplifier 30 is also delivered through the resistance element $R_8$ to another inverting operational amplifier 32. The amplifier 32 has, as indicated in the drawing, a gain $G=-1$. Coupled in parallel between the input terminal and output terminal of the amplifier 32 is the feedback resistance element $R_9$. The output from the inverting amplifier 32 is, as designated in the drawing, an analog voltage equal to $+V_{ref}$. The reference voltage $+V_{ref}$ is, as indicated, delivered to the digital-to-analog converter 22.

As shown in the drawing, the output from the digital-to-analog converter 22 is an analog signal and this signal is delivered to another operational amplifier 34 which, like the amplifier 32, is an inverting amplifier. In addition, amplifier 34 has a low output impedance and a high input impedance. The output from the operational amplifier 34 is, as indicated, delivered to a demultiplexer 36. Although demultiplexer 36 is, as indicated in the drawing, provided with seven outputs it is to be understood that in practice many more outputs may be made available and that the illustration in the drawing is intended to provide one illustrative embodiment of the system of the invention. Each output from the demultiplexer 36 represents a particular channel which corresponds to a particular geophone signal. As indicated each output channel from the demultiplexer 36 is provided with a hold circuit 38, a filter circuit 40, a fixed gain amplifier 42. Ultimately, the signal from each fixed gain amplifier 42 is delivered to a separate channel on a galvanometer-type oscillograph 44.

When the field recorded seismic data is to be played back the floating point digital words are entered one-at-a-time in the register 20. It may, for purposes of the present disclosure, be assumed that the seismic data is recorded in floating point digital word form on magnetic tape which is included in the floating point amplifier system of Vanderford, hereinbefore identified, and that, subsequently, the floating point digital words, or numbers, are transferred from the magnetic tape to the register 20. Subsequently, the three binary bits $e_1$, $e_2$ and $e_3$ which represent the decimal number exponent $E$ are transferred from the register 20 to the input terminals of the decoder unit 24. In the decoder unit 24 the three binary bits representing exponent $E$ are decoded; i.e., converted to an output voltage having a unique voltage level corresponding to the particular exponent $E$ represented by the input binary bits $e_1$, $e_2$, and $e_3$. In the example shown in the drawing and herein discussed E may have any one of five values and hence the output voltages from decoder unit 24, may, correspondingly, have any one of the output voltage levels identified as $E=1$ through $E=5$, inclusive. It is to be understood that since each floating point digital word includes its own unique exponent E (or corresponding three binary bits $e_1$, $e_2$ and $e_3$) then one, and only one, of the aforementioned five output voltage levels corresponding to exponent $E$ is present as an output for each digital word.

Regardless of the particular path ($R_1$ through $R_5$ or correspondingly $E=1$ through $E=5$) enables, for the particular exponent value of E, the output voltage level delivered by the decoder unit 24 to be the output logic level ("1") which for convenience might be +8 volts. Before transferring the first of the floating point digital words from magnetic tape to register 20 a suitable bias voltage level may be applied through resistor $R_6$ through the switch 28, which switch would be closed prior to the introduction of said first floating point digital word. By appropriate choice of a bias voltage the output of the amplifier 30 which is $-V_{ref}$ may be present to any given voltage level within its output range. One convenient scheme would be to preset $-V_{ref}$ to $-$one-fourth volt then at "time word zero" (introduction of the first floating point digital word) a time signal derived from the magnetic tape would cause the switch 28 to open. Capacitor $C_1$ across the amplifier 30 will hold the value of $-V_{ref}$ but would decay at the normal $R_7$-$C_1$ exponential rate due to the resistance $R_7$ across $C_1$ if no voltages are applied from the output of the decoder unit 24. However, since floating point digital words are transferred from the magnetic tape of Vanderford's system, the decoder unit 24 generates a new output voltage level as each word from the magnetic tape is read and the aforementioned capacitor $C_1$ holds a decoded voltage level on one of the decoder resistors in the network 26 for the duration of the data word storage time which is dependent on the magnetic tape speed. For example, for 1 millisecond data the storage time would be 31 microseconds. If, for example, a 24 seismic trace system were used than an exponent value would be read for each seismic trace and applied to the decoder network 26 during the one millisecond sample rate period. In such a system it is to be understood that other information may be contained in the floating point digital word data. For example, words in channels 25 through 31 on the magnetic tape may contain no data or special data such as uphole or timebreak information.

The information contained in the average seismic record energy decay is embodied in the exponent $E$ value variation throughout the recording. This time varying decay in amplitude is used to apply an inverse gain to the playback system in such a way as to correct for the natural energy decay caused by the "shot" energy spreading out spherically as well as the reflected energy being attenuated in the earth formations. The corrected playback would yield a compressed amplitude signal variation which would fit on a limited dynamic range ocillograph paper recording.

The original floating point word or number recorded on the magnetic tape hereinbefore discussed is of the form:

$$e_{in} = \pm A 8^{-E} \quad \text{(Equation 2a)}$$

wherein $e_{in}$ is the geophone voltage, $A$ is the A–D converter, 22, word, or mantissa, and E is the exponent related to the base or radix 8. Using the method according to the copending U. S. Pat. application Ser. No. 786,555, filed 24 Dec. 1968, in behalf of James R. Vanderford and entitled "Playback System" (D070,613). The playback range may be converted in the digital-to-analog converter 22, as shown in the drawing, in accordance with the formula:

$$e_{out} = \pm (F+A)(G/B)^{-E} \quad \text{(Equation 3)}$$

wherein $e_{out}$ is the output voltage out of the amplifier 34, $A$ is the mantissa or digital-to-analog converter word, $G$ is the radix or base 8, $B$ is a compression factor (chosen as 4 in this illustrative example) and $F$ is a translation factor chosen to give continuity to the output voltage.

Since $e_{out}$ is the voltage delivered from the D-A converter 22 which is a function of the reference voltage $V_{ref}$ we can therefore write:

$$e_{out} = \pm V_{(D-A)} V_{ref} \quad \text{(Equation 4)}$$

$$V_{playback} = \pm (F+A)(8/4)^{-E} V_{ref} \quad \text{(Equation 5)}$$

wherein $V_{playback}$ represents the voltage level of the signal, visably shown, on the oscillogram, or other visible display.

$$V_{playback} = \pm (\text{Full Scale} + A)(8/4)^{-E}(V_{ref}) \quad \text{(Equation 6)}$$

wherein Full Scale means the decimal number one (1) for this illustrative embodiment $$V_{playback} = \pm (1+A) 2^{-E} (V_{ref}) \quad \text{(Equation 7)}$$

Now if $V_{ref}$ is proportional to the average exponent $(E)$ changes as follows:

$$V_{ref} = 2^E \text{ave} \quad \text{(equation 8)}$$

wherein $E^{ave}$ means the average of $E$, including its decay. then $$V_{playback} = \pm (1+A) 2^{-E} 2^E \text{ave} \quad \text{(Equation 9)}$$

The average change in the exponent 2 due to energy decay may be corrected. Short term changes in the exponent from rapid wave for changes may be left in their usual form and will follow the fast signal changes. The term $2^E$ave cancels the $2^{-E}$ave part of $$2^{-E} = 2^{-E_{ave}} 2^{E_{fast}}$$

The decoder unit network 26 then has to perform the inverse job of correcting the $V_{ref}$ so that it will have the following output voltage weights.

TABLE I

| E | $-V_{ref}$ |
|---|---|
| 1 | $-\frac{1}{2}$ volt |
| 2 | $-1$ volt |
| 3 | $-2$ volts |
| 4 | $-4$ volts |
| 5 | $-8$ volts |

Figure 2:
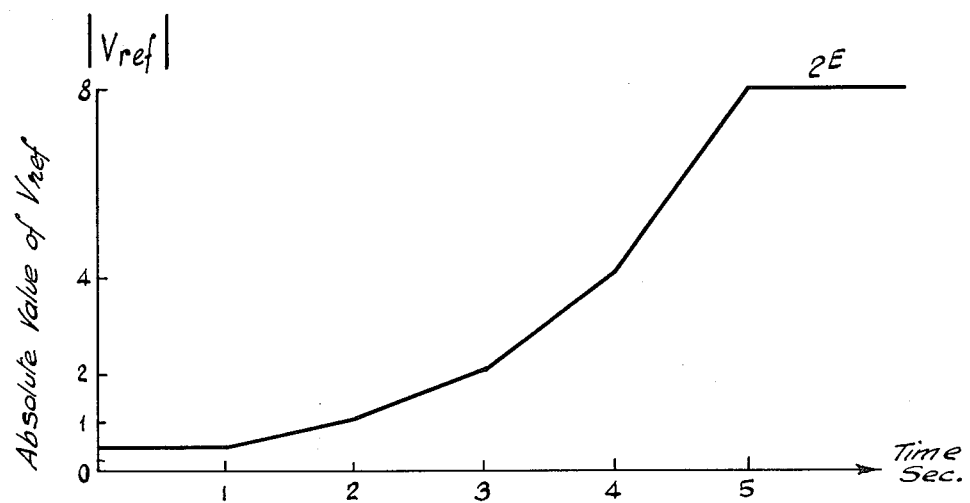

If the energy level of a recording died out exponentially at the rate of a unit exponent value each second from $E=1$ at the beginning then the variation would be as shown in FIG. 2.

The voltage of the various seismic traces would as a result be demultiplexed by unit 36 back into their individual traces where they are recreated by a hold circuit 38 and filtered by the filtering circuit 40 to remove the sample rate ripple and the signals are then fed to a constant gain amplifier 42 where the signal levels from the filters 40 are matched to the galvanometer current driven strings for proper deflection on a photographic paper for making the recordings of the ripple traces. The entire operation is synchronized with the arrival of data from the tape unit through a Master Timer shown in FIG. 1.

The entire playback ocillogram now has the usual AGC characteristic look since the average time varying energy level changes have been corrected for, leaving only the constant background levels with proper reflection amplitude standouts on the seismogram as is desired for proper interpretation.

Although specific ways and means of practicing the invention have been described hereinbefore, and illustrated in the accompanying drawing figures, it is, nevertheless, to be understood that this has been done for purposes of illustration, only, and that the scope of the invention is not to be limited thereby but is to be determined by the claims annexed herewith.

What is claimed is:

1. In a system wherein each analog signal, among a wide dynamic amplitude range of analog signals, is represented by a corresponding digital word in the form of digital signals representing the algebraic equation of $e_{in} = \pm AG^{-E}$ wherein $e_{in}$ represents the amplitude of a particular analog signal in said range, $A$ represents a mantissa, $G$ represents a radix of the number system used, and $E$ represents an exponent, and wherein some of said digital signals represent $A$ and some represent $E$, the method of making, from said digital signals, an analog signal $e_{out}$ suitable for making a visible display, comprising:

transferring the digital signals representing $A$ to a digital-to-analog converter;

transferring the digital signals representing each exponent $E$ to a decoder unit to develop a voltage representative of said exponent;

transferring said voltage representative of said exponent $E$ developed by said decoder unit to means including weighting and integrating networks for developing a voltage level representing $G^E$ave according to the average seismic record energy decay;

generating an analog reference voltage $V_{ref}$ from the last mentioned voltage level, wherein $V_{ref}=G^E$ave;

applying said reference voltage $V_{ref}$ to said digital-to-analog converter to develop an analog output voltage $e_{out}$ which is a function of $V_{ref}$ and the mantissa $A$;

processing said analog output voltage $e_{out}$ to develop a signal voltage $V_{playback}$; and visibly displaying said signal voltage $V_{playback}$.

2. The system in accordance with claim 1 wherein visibly displaying said signal voltage includes making an oscillogram of sais signal voltage.

3. The system according to claim 1 wherein $G=8$.

4. The system in accordance with claim 1 wherein $V_{playback} = \pm(1+A)2^{-E}(V_{ref})$.

5. In a system wherein each analog signal, among a wide dynamic amplitude range of analog signals, is represented by a corresponding digital word in the form of digital signals representing the algebraic equation $e_{in} = \pm AG^{-E}$ wherein $e_{in}$ represents the amplitude of a particular analog signal in said range, $A$ represents a mantissa, $G$ represents a radix of a number system used and $E$ represents an exponent, and wherein some of said digital signals represent $A$ and some represent $E$, apparatus for forming from said digital signals an analog signal $e_{out}$ suitable for making an oscillogram, comprising:

means for transferring the digital signals representing $A$ to a digital-to-analog converter;

means including a decoder unit for developing a voltage representative of said exponent $E$;

means including weighting and integrating networks for developing a voltage level representing $G^E$ave according to the average seismic record energy decay;

means for generating a reference voltage $V_{ref}$ from the last mentioned voltage level, wherein $V_{ref}=G^E$ave;

means for applying said reference voltage $V_{ref}$ to said digital-to-analog converter to develop an analog output voltage $e_{out}$ which is a function of $V_{ref}$ and the mantissa $A$; and means for processing said analog output voltage $e_{out}$ to develop a signal voltage $V_{playback}$.

6. The system according to claim 5 further comprising means for visibly displaying said signal voltage $V_{playback}$.

7. The system in accordance with claim 6 wherein said means for visibly displaying said signal voltage includes means for making an oscillogram of said signal voltage $V_{playback}$.

8. A method of making minimally distorted compressed dynamic amplitude range analog signals, suitable for making oscillograms from wide dynamic amplitude range analog signals, comprising:

a. converting each said wide dynamic amplitude range analog signal to a plurality of digital signals representing a digital word, said digital word, in turn, representing the mathematical relationship $e_{in} = \pm AG^{-E}$ wherein $e_{in}$ represents the amplitude of each said wide dynamic amplitude range analog signal, $A$ represents a mantissa, $G$ is a constant and represents a radix of the number system employed, $E$ represents an exponent, and wherein some of said digital signals of said digital word represent $A$ and other represent $E$;

b. storing said digital signals representing $A$ and $E$;

c. decoding the stored digital signals representing $E$ and providing a first analog signal representative of $E_{ave}$ wherein $E_{ave}$ represents the average value of $E$, including the energy decay thereof;

d. generating, by weighting and integrating, a second analog signal $V_{ref}$ defined by the mathematical relationship $V_{ref} = (G^E\text{ave}/B)$ wherein $B$ represents a compression factor;

e. converting the stored digital signals representing $A$ to a third analog signal $V_{D-A}$ representative of $A$; and f. combining said second and third analog signals to provide a fourth analog signal $V_{playback}$ defined by the relationship $V_{playback} = (F+A)((G/B)^{-E}V_{ref}$ wherein $F$ is a translation factor.

* * * * *